(12) United States Patent
Andersen et al.

(10) Patent No.: US 7,507,427 B2
(45) Date of Patent: Mar. 24, 2009

(54) COATED DEGRADABLE CHEWING GUM WITH IMPROVED SHELF LIFE AND PROCESS FOR PREPARING SAME

(75) Inventors: Lone Andersen, Middelfart (DK); Helle Wittorff, Vejle Ø (DK); Anette Isaksen, Kolding (DK)

(73) Assignee: Gumlink A/S, Vejle (DK)

( * ) Notice: Subject to any disclaimer, the term of this patent is extended or adjusted under 35 U.S.C. 154(b) by 682 days.

(21) Appl. No.: 10/472,122

(22) PCT Filed: Mar. 25, 2002

(86) PCT No.: PCT/DK02/00200

§ 371 (c)(1),
(2), (4) Date: Mar. 24, 2004

(87) PCT Pub. No.: WO02/076227

PCT Pub. Date: Oct. 3, 2002

(65) Prior Publication Data

US 2004/0146599 A1 Jul. 29, 2004

Related U.S. Application Data

(60) Provisional application No. 60/303,096, filed on Jul. 6, 2001.

(30) Foreign Application Priority Data

Mar. 23, 2001 (DK) ............................... 2001 00491

(51) Int. Cl.
*A23G 4/08* (2006.01)
(52) U.S. Cl. ........................................................ 426/5
(58) Field of Classification Search ...................... 426/3, 426/5, 6
See application file for complete search history.

(56) References Cited

U.S. PATENT DOCUMENTS

| | | | |
|---|---|---|---|
| 2,007,965 A | 7/1935 | Ellis | |
| 2,353,927 A | 7/1944 | Pickett | |
| 2,635,964 A | 4/1953 | Hewitt | |
| 3,262,784 A | 7/1966 | Bucher | |
| 3,440,060 A | 4/1969 | Rife et al. | |
| 3,800,006 A | 3/1974 | Katayama et al. | |
| 4,057,537 A | 11/1977 | Sinclair | |
| 4,317,838 A * | 3/1982 | Cherukuri et al. | 426/5 |
| 4,329,369 A | 5/1982 | Tezuka et al. | |
| 4,525,363 A | 6/1985 | D'Amelia | |
| 4,731,435 A | 3/1988 | Greene et al. | |
| 4,882,168 A | 11/1989 | Casey et al. | |
| 5,354,556 A | 10/1994 | Sparks et al. | |
| 5,463,960 A * | 11/1995 | Lowry | 426/5 |
| 5,478,593 A | 12/1995 | Serpelloni et al. | |
| 5,530,074 A | 6/1996 | Jarrett et al. | |
| 5,567,450 A | 10/1996 | Zuromski et al. | |
| 5,610,266 A | 3/1997 | Buchholz | |
| 5,612,070 A | 3/1997 | Yatka et al. | |
| 5,672,367 A | 9/1997 | Grijpma et al. | |
| 6,013,287 A | 1/2000 | Bunczek et al. | |
| 6,153,231 A | 11/2000 | Li et al. | |
| 6,190,773 B1 | 2/2001 | Imamura et al. | |
| 6,194,008 B1 | 2/2001 | Li et al. | |
| 6,441,126 B1 | 8/2002 | Cook et al. | |
| 2004/0115305 A1 | 6/2004 | Andersen et al. | |
| 2004/0142066 A1 | 7/2004 | Andersen et al. | |
| 2004/0156949 A1 | 8/2004 | Andersen et al. | |
| 2004/0180111 A1 | 9/2004 | Andersen et al. | |
| 2006/0051455 A1 | 3/2006 | Andersen et al. | |
| 2006/0141094 A1 | 6/2006 | Sato et al. | |
| 2006/0147580 A1 | 7/2006 | Nissen et al. | |

FOREIGN PATENT DOCUMENTS

| | | |
|---|---|---|
| EP | 0 415 656 A2 | 6/1991 |
| EP | 0 258 780 B1 | 6/1993 |
| EP | 0 500 098 B1 | 1/1997 |
| EP | 0 558 965 B1 | 9/1997 |
| EP | 1 066 759 A1 | 1/2001 |
| EP | 0 711 506 B1 | 4/2003 |
| EP | 1 306 013 A1 | 5/2003 |
| EP | 1354908 A1 | 10/2003 |
| JP | 08-196214 | 6/1996 |

(Continued)

OTHER PUBLICATIONS

Ching, Chauncey, et al.; "Biodegradable Polymers and Packaging", Biodegradable Polymers and Packaging, (1993): p. 28-31.
Grijpma, Dirk W., et al., "(Co)polymers of L-lactide, 1" Macromolecules Chem. Phys. (1993): p. 1633-1647.
JP48-19950; Jun. 18, 1973; Translation (10 pages).
Food and Drug Administration, CFR, Title 21, Section 172,615 as Masticatory Substances Synthetic; p. 62; (Apr. 1, 2001 Edition).
EP 0 427 185 English Abstract; only one page.
JP 08-196214 English Abstract; only two pages.
International Search Report; PCT/DK02/00200; May 27, 2002.
Fiedler, H.P., Lexikon der Hilfstoffe für Pharmacie, Kosmetik und Anglenzende Gebiete, pp. 63-64 (1981).
de Jong, S.J. et al., "New Insights into the Hydrolytic Degradation of Poly(lactic acid): Participation of the Alcohol Terminus," Polymer, vol. 42 (2001) pp. 2795-2802.
Kenley, R.A.et al., Poly(lactide-co-glycolide) Decomposition Kinetics in Vivo and in Vitro, Macromolecules, vol. 20 (1987) pp. 2398-2403.

*Primary Examiner*—Arthur L Corbin
(74) *Attorney, Agent, or Firm*—Frost Brown Todd LLC; Karlyn A. Schnapp; Steven J. Goldstein

(57) ABSTRACT

A coated chewing gum element about 25 to 99.9% by weight of a chewing gum centre having at least one environmentally degradable elastomeric or resinous polymer and about 0.1 to 75% by weight of an outer coating and processes for providing the chewing gum. The outer coating is a hard sugar or sugarless coating, a film coating or a soft coating. The application of an outer coating prevents degradation of the degradable polymers prior to chewing due to physical or chemical effects, thereby improving the shelf life of the environmentally degradable chewing gum. After chewing, the chewing gum will degrade in the environment and can be removed more readily than chewing gum based on non-degradable polymers.

62 Claims, No Drawings

FOREIGN PATENT DOCUMENTS

| | | |
|---|---|---|
| JP | 09 047226 | 2/1997 |
| JP | 09502615 | 3/1997 |
| JP | 09-511531 | 11/1997 |
| JP | 2001-061415 | 3/2001 |
| WO | WO 94 11441 | 5/1994 |
| WO | WO 94 14331 | 7/1994 |
| WO | WO 94 16574 | 8/1994 |
| WO | WO 99/27798 | 6/1999 |
| WO | WO 00 19837 | 4/2000 |
| WO | WO 00/25598 | 5/2000 |
| WO | WO 00 35296 | 6/2000 |
| WO | WO 0035297 | 6/2000 |
| WO | WO 01 01788 | 1/2001 |
| WO | WO 01 47368 | 7/2001 |
| WO | WO 01 54512 | 8/2001 |
| WO | WO 02 076228 A1 | 10/2002 |
| WO | WO 02 076229 A1 | 10/2002 |
| WO | WO 02 076230 A1 | 10/2002 |
| WO | WO 02 076231 A1 | 10/2002 |
| WO | WO 02 076232 A1 | 10/2002 |
| WO | WO 2004 004479 | 1/2004 |
| WO | WO 2004 004480 | 1/2004 |
| WO | WO 2004 028266 | 4/2004 |
| WO | WO 2004 028268 | 4/2004 |
| WO | WO 2004 028269 | 4/2004 |
| WO | WO 2004 028270 | 4/2004 |
| WO | WO 2004 035965 | 4/2004 |
| WO | WO 2004 068964 | 8/2004 |

\* cited by examiner

COATED DEGRADABLE CHEWING GUM WITH IMPROVED SHELF LIFE AND PROCESS FOR PREPARING SAME

CROSS-REFERENCE TO RELATED APPLICATIONS

This application claims the benefit of U.S. Provisional Patent Application No. 60/303,096, filed Jul. 6, 2001, which is herein incorporate by reference in its entirety.

FIELD OF THE INVENTION

The present invention relates generally to the field of chewing gum manufacturing and in particular to chewing gums that are more environmentally degradable than currently available chewing gum products. Specifically, coated chewing gum products are provided having chewing gum centres comprising degradable elastomeric or resinous polymers, the presence of which renders chewed gum that is dropped more prone to degradation in the environment or easier to remove from surfaces.

TECHNICAL BACKGROUND AND PRIOR ART

It is generally recognized that chewing gum that is dropped in indoor or outdoor environments gives rise to considerable nuisances and inconveniences due to fact that the dropped gum sticks firmly to e.g. street and pavement surfaces and to shoes and clothes of people being present or moving in the environments. Adding substantially to such nuisances and inconveniences is the fact that currently available chewing gum products are based on the use of elastomeric and resinous polymers of natural or synthetic origin that are substantially non-degradable in the environment.

City authorities and others being responsible for cleanliness of indoor and outdoor environments therefore have to exercise considerable efforts to remove dropped chewing gum, such efforts, however, being both costly and without satisfactory results.

There have been attempts to reduce the nuisances associated with the widespread use of chewing gum e.g. by improving cleaning methods to make them more effective with regard to removal of dropped chewing gum remnants or by incorporating anti-sticking agents into chewing gum formulations. However, none of these precautions have contributed significantly to solving the pollution problem.

Recently, it has been disclosed, e.g. in U.S. Pat. No. 5,672,367 that chewing gum may be made from certain synthetic polymers having in their polymer chains chemically unstable bonds that can be broken under the influence of light or hydrolytically into water-soluble and non-toxic components. It is mentioned in this patent that chewing gum made from such polymers that are referred to as biodegradable are degradable in the environment.

WO 01/01788 discloses ingestible and degradable chewing gum based on a gum base of enzymatically hydrolysed proteins, in particular zein.

The fact that a chewing gum base component is physically, chemically or biologically degradable, however, gives rise to product stability problems, as the degradation which it is intended should progress after chewing of the gum may occur at a significant level during storage of such degradable chewing gum products, in other words, the shelf life of chewing gum comprising, as a gum base component, a degradable polymer, may be unacceptably shortened e.g. due to moisture conditions or light. An additional significant problem associated with such degradable chewing gums is that otherwise desirable chewing gum additives such as acids, flavour and active ingredient components incorporated into a degradable chewing gum formulation may, during storage of the finished products, have a deteriorating effect on the masticatory quality and other desired properties of the chewing gum due to incipient, pre-mature degradation inadvertently caused by such additives.

It has been now been found that the above pre-chewing deteriorating effects on chewing gum comprising degradable polymers can be substantially reduced by providing the chewing gum centres with a protective outer coating. Moreover, and unexpectedly, it was found that, in spite of the more delicate nature of the degradable polymers, it was possible to subject the degradable chewing gum to conventional coating processes, implying that the chewing gum centres are contacted with moisture, essentially without detectable inadvertent degradation of the degradable gum base polymers.

SUMMARY OF THE INVENTION

Accordingly, the present invention pertains in a first aspect to a coated chewing gum element comprising about 25 to about 99.9% by weight of a chewing gum centre comprising at least one environmentally degradable elastomeric or resinous polymer and about 0.1 to about 75% by weight of an outer coating. In one preferred embodiment, the outer coating causes, prior to chewing of the chewing gum, a reduction of the rate of degradation of the at least one environmentally degradable elastomeric polymer as compared to a chewing gum of the same composition that is not coated. In accordance with the invention the outer coating can be a hard coating, a soft coating or a film coating of any type that is known in the art, or a combination of such coatings.

In a further aspect there is provided a hard coating process for preparing a chewing gum element as defined above, comprising the steps of (i) preparing a chewing gum mass comprising at least one environmentally degradable elastomeric or resinous polymer, (ii) forming said chewing gum mass in to a desired gum centre form, (iii) subjecting the thus formed chewing gum centres to at least one coating cycle comprising applying onto the gum centres an aqueous solution of a coating agent, and (iii) repeating said cycle until the coating layer constitutes 0.1 to 75% by weight of the chewing gum element. In one presently preferred embodiment, the coating agent applied in the hard coating process is a sugarless coating agent, e.g. a polyol including as examples sorbitol, maltitol, mannitol, xylitol, erythritol, lactitol and isomalt or e.g. a mono-di-saccharide including as example trehalose.

In a still further aspect the invention relates to a process for coating a chewing gum element as defined above, comprising the steps of (i) preparing a chewing gum mass comprising at least one environmentally degradable elastomeric or resinous polymer, (ii) forming said chewing gum mass into a desired chewing gum centre form, such as a stick, (iii) applying onto at least a part of the thus formed chewing gum centres an edible film comprising at least one edible film-forming agent and optionally, a wax to thereby obtain an at least partially coated chewing gum element comprising from 0.1 to 75% by weight of the coating layer. In useful embodiments the film-forming agent is a cellulose derivative, a modified starch, a dextrin, gelatine, zein, shellec, gum arabic, a vegetable gum or a combination thereof.

In yet another aspect the invention provides a soft coating process for obtaining a coated chewing gum element as defined herein, comprising the steps of (i) preparing a chewing gum mass comprising at least one environmentally degradable elastomeric or resinous polymer, (ii) forming said chewing gum mass into a desired chewing gum centre form, (iii) subjecting the thus obtained chewing gum centres to a soft coating process e.g. comprising alternately applying to the centres a non-crystallisable hydrogenated or carbohydrate syrup, e.g. comprising a starch hydrolysate or hydrogenated starch hydrolysate and a carbohydrate or hydrogenated carbohydrate powder until the soft coating layer constitutes 0.1 to 75% by weight of the chewing gum element. Or alternatively a sugarfree soft coating e.g. comprising alternately applying to the centres a syrup of a polyol or a mono-disaccharide, including as examples sorbitol, maltitol, mannitol, xylitol, erythritol, lactitol and isomalt or a mono-di-saccharide including as example trehalose, and a sugarfree polyol or mono-di-saccharide powder, e.g. sorbitol, maltitol, mannitol, xylitol, erythritol, lactitol and isomalt or e.g. trehalose powder until the soft coating layer constitutes 0.1 to 75% by weight of the chewing gum element.

According to the provisions of the invention, a biodegradable chewing gum may be obtained having advantageous bio-degradable properties both prior and subsequent to in-use-chewing of the gum. Some of the desired and obtained properties are more specifically, that the biodegradation is relatively in-active prior to use of the chewing gum, i.e. during distribution and that the biodegradation is primarily initiated when (and after) the chewing gum is used by the consumer.

When keeping acids, flavors and active ingredients in the coat, i.e. components accelerating the biodegradation of the polymer of the gum base, these components may primarily activate the biodegradation, when a user by chewing has mixed the substances into the biodegradable gum base.

Moreover, according to an embodiment of the invention, the coating itself is applied as a barrier to biodegradation activated by environmental influenced biodegradation. The applied barrier may e.g. protect the biodegradable polymers of the gum against humidity or light, both physical parameters accelerating the degradation of the polymer. When the chewing gum has been chewing, the barrier is gone and ineffective, thereby facilitating the desired degradation.

DETAILED DISCLOSURE OF THE INVENTION

"The present invention provides storage stable chewing products that following chewing are more readily degraded in the environment if improperly dropped or discarded here by the user and/or which, relatively to chewing gum comprising conventional non-degradable polymers, can be removed more readily mechanically and/or by the use of cleaning agents and which, prior to being subject to chewing, have a satisfactory shelf life."

The chewing gum products of the invention are coated chewing gum elements comprising a chewing gum centre comprising at least one environmentally degradable elastomeric or resinous polymer and an outer coating. In a preferred embodiment, the chewing gum element is such an element where the presence of the outer coating, prior to chewing of the chewing gum, causes a reduction of the rate of degradation of the at least one environmentally degradable elastomeric polymer as compared to a chewing gum of the same composition that is not coated. It will be appreciated that the "rate of degradation" refers to the rate whereby the average value for the molecular weight (number average, $\overline{M}_n$ or weight average, $\overline{M}_w$) of the degradable polymer is reduced during storage.

As used herein, the term "chewing gum centre" refers to a piece or body of chewing gum that is of an appropriate size and form to make up a finished chewing gum element when provided with 0.1 to 75% by weight of an outer coating. Generally, a chewing gum centre is provided by admixing a chewing gum base part comprising water-insoluble polymers and a chewing gum additive part consisting predominantly of water soluble components. As used herein, the expression "gum base component" refers to any component that is conventionally used in the industry to provide the water insoluble part of the chewing gum, generally being referred to as the gum base, that determines the masticatory properties of the final chewing gum product and which typically constitutes 10 to 99% by weight (preferably 10 to 50% by weight) of the total chewing gum centre formulation.

A coated chewing gum element, as described herein, may comprise about 25 to about 99.9% by weight of a chewing gum centre comprising at least one environmentally degradable elastomeric or resinous polymer and about 0.1 to about 75% by weight of an outer coating. This goes for all aspects and embodiments described herein.

Chewing Gum Base Formulation

Generally, a chewing gum base formulation comprises one or more elastomeric compounds which may be of synthetic or natural origin, one or more resinous compounds, one or more elastomer plasticizers also known as resins, fillers, softening compounds and minor amounts of miscellaneous ingredients such as antioxidants and colorants and others.

As defined herein, the chewing gum centre comprises at least one physically, chemically or biologically degradable elastomeric or resinous polymer. Such polymers can, in contrast to currently used types of elastomers and resins, be degraded in the environment after mastication of the chewing gum, thereby giving rise to less environmental pollution than chewing gums based on non-degradable polymers, as the used chewing gum will eventually disintegrate and/or can be removed more readily by physical or chemical means from the site where it is dumped.

As used herein the expression "degradable polymer" refers to a chewing gum base component or a chewing gum base which, after dumping the chewing gum or even during chewing, is capable of undergoing a physical, chemical and/or biological degradation whereby the dumped chewing gum waste becomes more readily removable from the site of dumping or is eventually disintegrated to lumps or particles which are no longer recognisable as being chewing gum remnants. The degradation or disintegration of such degradable polymers can be effected or induced by physical factors such as temperature, light, moisture, by chemical factors such as hydrolysis caused by a change in pH or by the action of appropriate enzymes capable of degrading the polymers.

In the present context, suitable examples of such environmentally or biologically degradable chewing gum base polymers include a polymer selected from the group consisting of esters, carbonates, ethers, amides, urethans, peptides, homopolymers of amino acids such as polylysine, and proteins including derivatives hereof such as e.g. protein hydrolysates including a zein hydrolysate.

Preferred polymers include polymers selected from the group consisting of degradable homopolymers, copolymers, terpolymers, and graftpolymers.

A preferred compound is a polyester and particularly useful compounds of this type include polyester polymers obtained by the polymerisation of one or more cyclic esters as disclosed in U.S. Pat. No. 5,672,367 which is incorporated herein by reference. The polymers disclosed in this reference are characterised by having chemically unstable bonds in the polymer chain which can be broken e.g. hydrolytically or by exposure to light.

An important feature of the degradable polymers as used herein is that they contain chemically unstable bonds that can be broken in the chewed chewing gum under environmental conditions. In the present context, the term "environmental condition" denotes indoor and outdoor locations and the temperature, light and humidity conditions prevailing in such environments. It will be appreciated that the rate of degradation of the degradable polymer in chewing gum remnants dropped in a given environment will depend on the above physical conditions. In preferred embodiments, the degradable polymer is one where, under any given environmental conditions except extreme cold temperature conditions, i.e. at temperatures below 0° C., at least 5% of unstable bonds, preferably at least 10%, more preferably at least 15% including at least 25% of unstable bonds are broken after one month to 12 months under environmental conditions.

In presently preferred embodiments, the at least one degradable elastomeric or resinous polymer of the coated chewing gum element is a polyester polymer made from a cyclic ester selected from the group of a lactide, a glycolide, trimethylene carbonate, δ-valerolactone, β-propiolactone and ε-caprolactone. Such polymers may be homopolymers, co-or terpolymers, including block or graft co-polymers, such as e.g. a copolymer of lactide and ε-caprolactone including such a copolymer wherein the initial molecular weight ratio between the lactide and ε-caprolactone is in the range of 99:1 to 80:20 such as in the range of 95:5 to 90:10, and a copolymer of ε-caprolactone and δ-valerolactone.

Generally, chewing gum base formulations include elastomeric and resinous polymers of different molecular weights. Accordingly, the degradable polymer can be of an average molecular weight ($M_w$) that is in the range of 1,000 to 9,999 g/mol, the range of 10,000 to 99,999 g/mol or the range of 100,000 to 1,000,000 g/mol.

The chewing gum centres as defined above may comprise a gum base part where all of the elastomeric or resinous components are degradable polymers. However, it is within the scope of the invention that the gum base part, in addition to one or more degradable polymers, contains a proportion of non-degradable polymeric elastomers and/or resins which may be natural or synthetic polymers. The proportion of such non-degradable polymers may be in the range of 1-99% by weight including the range of 5 to 90% by weight such as in the range of 10-50% by weight.

In this context, useful synthetic elastomers include, but are not limited to, synthetic elastomers listed in Food and Drug Administration, CFR, Title 21, Section 172,615, the Masticatory Substances, Synthetic) such as polyisobutylene with a gel permeation chromatography (GPC) average molecular weight in the range of about 10,000 to about 1,000,000 including the range of 50,000 to 80,000, isobutylene-isoprene copolymer (butyl elastomer), styrene-butadiene copolymers e.g. having styrene-butadiene ratios of about 1:3 to about 3:1, polyvinyl acetate (PVA) having a GPC average molecular weight in the range of 2,000 to about 90,000 such as the range of 3,000 to 80,000 where the higher molecular weight polyvinyl acetates are typically used in bubble gum base, polyisoprene, polyethylene, vinyl acetate-vinyl laurate copolymer e.g. having a vinyl laurate content of about 5 to about 50% by weight such as 10 to 45% by weight of the copolymer, and combinations hereof.

It is e.g. common in the industry to combine in a gum base a synthetic elastomer having a high molecular weight and a low-molecular-weight elastomer. Presently preferred combinations of synthetic elastomers include, but are not limited to, polyisobutylene and styrene-butadiene, polyisobutylene and polyisoprene, polyisobutylene and isobutylene-isoprene copolymer (butyl rubber) and a combination of polyisobutylene, styrene-butadiene copolymer and isobutylene isoprene copolymer, and all of the above individual synthetic polymers in admixture with polyvinyl acetate, vinyl acetate-vinyl laurate copolymers, respectively and mixtures thereof.

Useful natural non-degradable elastomers include the elastomers listed in Food and Drug Administration, CFR, Title 21, Section 172,615, as "Masticatory Substances of Natural Vegetable Origin" including natural rubber compounds such as smoked or liquid latex and guayule and other natural gums including jelutong, lechi caspi, massaranduba balata, sorva, perillo, rosindinha, massaranduba chocolate, chicle, nispero, gutta hang kang, and combinations thereof. The preferred synthetic elastomer and natural elastomer concentrations vary depending on whether the chewing gum in which the base is used is adhesive or conventional, bubble gum or regular gum, as discussed below. Presently preferred natural elastomers include jelutong, chicle, massaranduba balata and sorva.

In accordance with the invention, the chewing gum base components which are useful may include one or more resinous compounds contributing to obtain the desired masticatory properties and acting as plasticizers for the elastomers of the gum base composition. In the present context, useful elastomer plasticizers include, but are not limited to, natural rosin esters, often referred to as ester gums including as examples glycerol esters of partially hydrogenated rosins, glycerol esters of polymerised rosins, glycerol esters of partially dimerised rosins, glycerol esters of tally oil rosins, pentaerythritol esters of partially hydrogenated rosins, methyl esters of rosins, partially hydrogenated methyl esters of rosins, pentaerythritol esters of rosins. Other useful resinous compounds include synthetic resins such as terpene resins derived from alpha-pinene, beta-pinene, and/or d-limonene, natural terpene resins; and any suitable combinations of the foregoing. The preferred elastomer plasticizers will also vary depending on the specific application, and on the type of elastomer(s) being used.

A chewing gum base formulation may, if desired, include one or more fillers/texturisers including as examples, magnesium and calcium carbonate, sodium sulphate, ground limestone, silicate compounds such as magnesium and aluminium silicate, kaolin and clay, aluminium oxide, silicium oxide, talc, titanium oxide, mono-, di- and tri-calcium phosphates, cellulose polymers, such as wood, and combinations thereof.

The fillers/texturisers may also include natural organic fibres such as fruit vegetable fibres, grain, rice, cellulose and combinations thereof.

As used herein the term "softener" designates an ingredient, which softens the gum base or chewing gum formulation and encompasses waxes, fats, oils, emulsifiers, surfactants and solubilisers.

A gum base formulation may, in accordance with the present invention comprise one or more fats e.g. tallow, hydrogenated tallow, any completely or partially hydrogenated animal fats, completely hydrogenated and partially hydrogenated vegetable oils or fats, cocoa butter, degreased cocoa butter, glycerol monostearate, glycerol triacetate, lecithin, mono-, di- and triglycerides, acetylated monoglycerides, fatty acids (e.g. stearic, palmitic, oleic and linoleic acids), and/or combinations thereof.

To soften the gum base further and to provide it with water binding properties, which confer to the gum base a pleasant smooth surface and reduce its adhesive properties, one or more emulsifiers is/are usually added to the composition, typically in an amount of 0 to 18% by weight, preferably 0 to 12% weight of the gum base. Mono- and diglycerides of edible fatty acids, lactic acid esters and acetic acid esters of mono- and di- and triglycerides of edible fatty acids, acetylated mono and diglycerides, sucrose polyesters or sugar esters of edible fatty acids including those disclosed in WO 00/25598, which is incorporated herein by reference, Na-, K-, Mg- and Ca-stearates, lecithin, hydroxylated lecithin, glycerol monostearate, glycerol triacetate, fatty acids (e.g. stearic, palmitic, oleic and linoleic acids), propylgallates and combinations thereof are examples of conventionally used emulsifiers which can be added to the chewing gum base. In case of the presence of a biologically or pharmaceutically active ingredient as defined below, the formulation may comprise certain specific emulsifiers and/or solubilisers in order to disperse and release the active ingredient.

Waxes are conventionally used for the adjustment of the consistency and for softening of the chewing gum base when preparing chewing gum bases. In connection with the present invention any conventionally used and suitable type of wax may be used, such as for instance rice bran wax, polyethylene wax, petroleum wax (refined paraffin and microcrystalline wax), paraffin, bees' wax, carnauba wax, and candelilla wax.

Furthermore, the gum base formulation may, in accordance with the present invention, comprise colourants and whiteners such as FD&C-type dyes and lakes, fruit and vegetable extracts, titanium dioxide and combinations thereof. Further useful chewing gum base components include antioxidants, e.g. butylated hydroxytoluene (BHT), butyl hydroxyanisol (BHA), propylgallate and tocopherols, and preservatives.

The composition of chewing gum base formulations which are admixed with chewing gum additives as defined below can vary substantially depending on the particular product to be prepared and on the desired masticatory and other sensory characteristics of the final product. However, typical ranges. (weight %) of the above gum base components are: 5 to 100% by weigth elastomeric compounds, 5 to 55% by weight elastomer plasticizers, 0 to 50% by weight filler/texturiser, 5 to 35% by weight softener and 0 to 1% by weight of miscellaneous ingredients such as antioxidants, colourants, etc.

Chewing Gum Additives

A chewing gum centre formulation comprises, in addition to the above water-insoluble gum base components, a generally water soluble part comprising a range of chewing gum additives. In the present context, the term "chewing gum additive" is used to designate any component, which in a conventional chewing gum manufacturing process is added to the gum base. The major proportion of such conventionally used additives are water soluble, but water-insoluble components, such as e.g. water-insoluble flavouring compounds, can also be included.

In the present context, chewing gum additives include bulk sweeteners, high intensity sweeteners, flavouring agents, softeners, emulsifiers, colouring agents, binding agents, acidulants, fillers, antioxidants and other components such as pharmaceutically or biologically active substances, conferring desired properties to the finished chewing gum product.

Suitable bulk sweeteners include both sugar and non-sugar sweetening components. Bulk sweeteners typically constitute from about 5 to about 95% by weight of the chewing gum, more typically about 20 to about 80% by weight such as 30 to 70% or 30 to 60% by weight of the gum.

Useful sugar sweeteners are saccharide-containing components commonly known in the chewing gum art including, but not limited to, sucrose, dextrose, maltose, dextrins, trehalose, D-tagatose, dried invert sugar, fructose, levulose, galactose, corn syrup solids, and the like, alone or in combination.

Sorbitol can be used as a non-sugar sweetener. Other useful non-sugar sweeteners include, but are not limited to, other sugar alcohols such as mannitol, xylitol, hydrogenated starch hydrolysates, maltitol, isomalt, erythritol, lactitol and the like, alone or in combination.

High intensity artificial sweetening agents can also be used alone or in combination with the above sweeteners. Preferred high intensity sweeteners include, but are not limited to, sucralose, aspartame, salts of acesulfame, alitame, saccharin and its salts, cyclamic acid and its salts, glycyrrhizin, dihydrochalcones, thaumatin, monellin, sterioside and the like, alone or in combination. In order to provide longer lasting sweetness and flavour perception, it may be desirable to encapsulate or otherwise control the release of at least a portion of the artificial sweetener. Techniques such as wet granulation, wax granulation, spray drying, spray chilling, fluid bed coating, coascervation, encapsulation in yeast cells and fibre extrusion may be used to achieve desired release characteristics. Encapsulation of sweetening agents can also be provided using another chewing gum component such as a resinous compound.

Usage level of the artificial sweetener will vary considerably and will depend on factors such as potency of the sweetener, rate of release, desired sweetness of the product, level and type of flavour used and cost considerations. Thus, the active level of artificial sweetener may vary from about 0.001 to about 8% by weight (preferably from about 0.02 to about 8% by weight). When carriers used for encapsulation are included, the usage level of the encapsulated sweetener will be proportionately higher. Combinations of sugar and/or non-sugar sweeteners can be used in the chewing gum formulation processed in accordance with the invention. Additionally, the softener may also provide additional sweetness such as with aqueous sugar or alditol solutions.

If a low calorie gum is desired, a low caloric bulking agent can be used. Examples of low caloric bulking agents include polydextrose, Raftilose, Raftilin, fructooligosaccharides (NutraFlora®), palatinose oligosaccharides; guar gum hydrolysates (e.g. Sun Fiber®) or indigestible dextrins (e.g. Fibersol®). However, other low calorie-bulking agent can be used.

Further chewing gum additives which may be included in the chewing gum mixture processed in the present process include surfactants and/or solubilisers, especially when pharmaceutically or biologically active ingredients are present. As examples of types of surfactants to be used as solubilisers in a chewing gum composition according to the invention reference is made to H. P. Fiedler, Lexikon der Hilfstoffe für Pharmacie, Kosmetik und Angrenzende Gebiete, page 63-64 (1981) and the lists of approved food emulsifiers of the individual countries. Anionic, cationic, amphoteric or non-ionic solubilisers can be used. Suitable solubilisers include lecithin, polyoxyethylene stearate, polyoxyethylene sorbitan fatty acid esters, fatty acid salts, mono and diacetyl tartaric acid esters of mono and diglycerides of edible fatty acids, citric acid esters of mono and diglycerides of edible fatty acids, saccharose esters of fatty acids, polyglycerol esters of fatty acids, polyglycerol esters of interesterified castor oil acid (E476), sodium stearoyllatylate, sodium lauryl sulfate and sorbitan esters of fatty acids and polyoxyethylated hydrogenated castor oil (e.g. the product sold under the trade name CREMOPHOR), block copolymers of ethylene oxide and propylene oxide (e.g. products sold under trade names PLURONIC and POLOXAMER), polyoxyethylene fatty alcohol ethers, polyoxyethylene sorbitan fatty acid esters, sorbitan esters of fatty acids and polyoxyethylene steraric acid esters.

Particularly suitable solubilisers are polyoxyethylene stearates, such as for instance polyoxyethylene(8)stearate and polyoxyethylene(40)stearate, the polyoxyethylene sorbitan fatty acid esters sold under the trade name TWEEN, for instance TWEEN 20 (monolaurate), TWEEN 80 (monooleate), TWEEN 40 (monopalmitate), TWEEN 60 (monostearate) or TWEEN 65 (tristearate), mono and diacetyl tartaric acid esters of mono and diglycerides of edible fatty acids, citric acid esters of mono and diglycerides of edible fatty acids, sodium stearoyllatylate, sodium laurylsulfate, polyoxyethylated hydrogenated castor oil, blockcopolymers of ethylene oxide and propyleneoxide and polyoxyethylene fatty alcohol ether. The solubiliser may either be a single compound or a combination of several compounds. In the presence of an active ingredient the chewing gum may preferably also comprise a carrier known in the art.

The chewing gum centres provided herein may contain aroma agents and flavouring agents including natural and synthetic flavourings e.g. in the form of natural vegetable components, essential oils, essences, extracts, powders, including acids and other substances capable of affecting the taste profile. Examples of liquid and powdered flavourings include coconut, coffee, chocolate, vanilla, grape fruit, orange, lime, menthol, liquorice, caramel aroma, honey aroma, peanut, walnut, cashew, hazelnut, almonds, pineapple, strawberry, raspberry, tropical fruits, cherries, cinnamon, peppermint, wintergreen, spearmint, eucalyptus, and mint, fruit essence such as from apple, pear, peach, strawberry, apricot, raspberry, cherry, pineapple, and plum essence. The essential oils include peppermint, spearmint, menthol, eucalyptus, clove oil, bay oil, anise, thyme, cedar leaf oil, nutmeg, and oils of the fruits (e.g. lemon, bergamot and orange) as mentioned above.

The chewing gum flavour may be a natural flavouring agent which is freeze-dried, preferably in the form of a powder, slices or pieces of combinations thereof. The particle size may be less than 3 mm, such as less than 2 mm, more preferred less than 1 mm, calculated as the longest dimension of the particle. The natural flavouring agent may be in a form where the particle size is from about 3 µm to 2 mm, such as from 4 µm to 1 mm. Preferred natural flavouring agents include seeds from a fruit e.g. from strawberry, blackberry and raspberry.

Various synthetic flavours, such as mixed fruit flavours may also be used in the present chewing gum centres. As indicated above, the aroma agent may be used in quantities smaller than those conventionally used. The aroma agents and/or flavours may be used in an amount of from 0.01 to about 30% by weight (preferably from 0.01 to about 15% by weight) of the final product depending on the desired intensity of the aroma and/or flavour used. Preferably, the content of aroma/flavour is in the range of from 0.2 to 3% by weight of the total composition.

Also various acids are used typically in combination with fruit flavors, such as adipinic acid, succinic acid, fumaric acid, or salts thereof or salts of citric acid, tartaric acid, malic acid, acetic acid, lactic acid, phosphoric acid and glutaric acid.

In one embodiment the chewing gum centre composition comprises a pharmaceutically or biologically active substance. Examples of such active substances, a comprehensive list of which is found e.g. in WO 00/25598, which is incorporated herein by reference, include drugs, dietary supplements, antiseptic agents, pH adjusting agents, anti-smoking agents and substances for the care or treatment of the oral cavity and the teeth such as hydrogen peroxide and compounds capable of releasing urea during chewing. Examples of active substances in the form of agents adjusting the pH in the oral cavity include: acids, such as adipinic acid, succinic acid, fumaric acid, or salts thereof or salts of citric acid, tartaric acid, malic acid, acetic acid, lactic acid, phosphoric acid and glutaric acid and acceptable bases, such as carbonates, hydrogen carbonates, phosphates, sulphates or oxides of sodium, potassium, ammonium, magnesium or calcium, especially magnesium and calcium.

The gum centre of coated chewing gum element according to the invention can have any form, shape or dimension that permits the chewing gum centre to be coated using any conventional coating process including those described in the following. Accordingly, the gum centre may be e.g. in a form selected from a pellet, a cushion-shaped pellet, a stick, a tablet, a chunk, a pastille, a pill, a ball and a sphere.

Outer Coating Types and Formulations

In accordance with the invention, the chewing gum element comprises about 0.1 to about 75% by weight of an outer coating applied onto the chewing gum centre. In the present context, a suitable outer coating is any coating that results in an extended storage stability of the environmentally degradable chewing gum products as defined above, relative to a chewing gum of the same composition that is not coated. Thus, suitable coating types include hard coatings, film coatings and soft coatings of any composition including those currently used in coating of chewing gum, pharmaceutical products and confectioneries.

One presently preferred outer coating type is a hard coating, which term is used in the conventional meaning of that term including sugar coatings and sugar-free (or sugarless) coatings and combinations thereof. The objects of hard coating is to obtain a sweet, crunchy layer which is appreciated by the consumer and to protect the gum centres for various reasons as, in the case of the degradable gum centres according to the invention, from pre-chewing degradation. In a typical process of providing the chewing gum centres with a protective sugar coating the gum centres are successively treated in suitable coating equipment with aqueous solutions of crystallisable sugar such as sucrose or dextrose, which, depending on the stage of coating reached, may contain other functional ingredients, e.g. fillers, binding agents, colours, etc. In the present context, the sugar coating may contain further functional or active compounds including flavour compounds, pharmaceutically active compounds and/or polymer degrading substances.

In the production of chewing gum it may, however, be preferred to replace the cariogenic sugar compounds in the coating by other, preferably crystallisable, sweetening compounds that do not have a cariogenic effect. In the art such coating are generally referred to as sugarless or sugar-free coatings. Presently preferred non-cariogenic hard coating substances include polyols, e.g. sorbitol, maltitol, mannitol, xylitol, erythritol, lactitol, isomalt and tagatose which are obtained by industrial methods by hydrogenation of D-glucose, maltose, fructose or levulose, xylose, erythrose, lactose, isomaltulose and D-galactose, respectively and trehalose, which is a non-cariogene mono-di-saccharide.

In a typical hard coating process as it will be described in details in the following, a suspension containing crystallisable sugar and/or polyol is applied onto the gum centres and the water it contains is evaporated off by blowing with air. This cycle must be repeated several times, typically 10 to 80 times, in order to reach the swelling required. The term "swelling" refers to the increase in weight or thickness of the products, as considered at the end of the coating operation by comparison with the beginning, and in relation to the final weight or thickness of the coated products. In accordance with the present invention, the coating layer constitutes about 0.1 to about 75% by weight of the finished chewing gum element, such as about 10 to about 60% by weight, including about 15 to about 50% by weight.

In further useful embodiments the outer coating of the chewing gum element of the invention is an element that is subjected to a film coating process and which therefore comprises one or more film-forming polymeric agents and optionally one or more auxiliary compounds, e.g. plasticizers, pigments and opacifiers. A film coating is a thin polymer-based coating applied to a chewing gum centre of any of the above forms. The thickness of such a coating is usually between 20 and 100 μm. Generally, the film coating is obtained by passing the chewing gum centres through a spray zone with atomised droplets of the coating materials in a suitable aqueous or organic solvent vehicle, after which the material adhering to the gum centres is dried before the next portion of coating is received. This cycle is repeated until the coating is complete.

In the present context, suitable film-coating polymers include edible cellulose derivatives such as cellulose ethers including methylcellulose (MC), hydroxyethyl cellulose (HEC), hydroxypropyl cellulose (HPC) and hydroxypropyl methylcellulose (HPMC). Other useful film-coating agents are acrylic polymers and copolymers, e.g. methylacrylate aminoester copolymer or mixtures of cellulose derivatives and acrylic polymers. A particular group of film-coating polymers, also referred to as functional polymers are polymers that, in addition to its film-forming characteristics, confer a modified release performance with respect to active components of the chewing gum formulation. Such release modifying polymers include methylacrylate ester copolymers, ethylcellulose (EC) and enteric polymers designed to resist the acidic stomach environment, yet dissolve readily in the duodenum. The latter group of polymers include: cellulose acetate phtalate (CAP), polyvinyl acetate phtalate (PVAP), shellac, metacrylic acid copolymers, cellulose acetate trimellitate (CAT) and HPMC. It will be appreciated that the outer film coating according to the present invention may comprise any combination of the above film-coating polymers.

In other embodiments, the film coating layer of the chewing gum elements according to the invention comprises a plasticizing agent having the capacity to alter the physical properties of a polymer to render it more useful in performing its function as a film-forming material. In general, the effect of plasticizers will be to make the polymer softer and more pliable as the plasticizer molecules interpose themselves between the individual polymer strands thus breaking down polymer-polymer interactions. Most plasticizers used in film coating are either amorphous or have very little crystallinity. In the present context, suitable plasticizers include polyols such as glycerol, propylene glycol, polyethylene glycol, e.g. the 200-6000 grades hereof, organic esters such as phtalate esters, dibutyl sebacate, citrate esters and thiacetin, oils/glycerides including castor oil, acetylated monoglycerides and fractionated coconut oil.

The choice of film-forming polymer(s) and plasticizing agent(s) for the outer coating of the present chewing gum element is made with due consideration for achieving the best possible barrier properties of the coating in respect of dissolution and diffusion across the film of moisture and gasses.

The film coating of the chewing gum elements may also contain one or more colourants or opacifiers. In addition to providing a desired colour hue, such agents may contribute to protecting the degradable polymers against pre-chewing degradation, in particular by reflecting light or by forming a barrier against moisture and gasses. Suitable colourants/pacifiers include organic dyes and their lakes, inorganic colouring agents, e.g. titanium oxide and natural colours such as e.g. β-carotene or chlorophyll.

Additionally, film coatings may contain one or several auxiliary substances such as flavours and waxes or saccharide compounds such as polydextrose, dextrins including maltodextrin, lactose, modified starch, a protein such as gelatine or zein, a vegetable gum and any combination thereof.

In one specific embodiment the chewing gum centre is in the form of a stick which is provided on at least one side with an edible film comprising layer of a coating of a film forming agent, e.g. a cellulose derivative, a modified starch, shallac, gum arabic, a dextrin, gelatine, zein, a vegetable gum, a synthetic polymer and any combination thereof, and a wax such as beeswax, carnauba wax, microcrystalline wax, paraffin wax and combinations thereof.

It is one important object of the invention to provide chewing gum which, due to its content of degradable gum base polymers, is more readily degraded in the environment and/or is more readily removed therefrom and which prior to chewing is protected against physical and chemical effects which can cause undesirable pre-chewing degradation. Accordingly, it is within the scope of the invention to provide chewing gum having an outer coating that affords a high degree of protection against degradation of the polymers. This e.g. is achieved by providing an outer coating that protects against the above physical and chemical factors such as light, oxygen or moisture. Alternatively, the protection against degradation of the polymers is effected by omitting the inclusion of chewing gum additives that, if present as a chewing centre component might cause polymer degradation and incorporating such substances in the outer coating. Examples of components that, if being in contact with the degradable polymers, might have an adverse effect on polymer stability prior to chewing include acidic components, e.g. acidic flavouring components or oxidising and hydrolysing substances. Additional substances that can advantageously be incorporated into the hard or film coating layer include substances that have the effect of enhancing degradation or hydrolysis of the degradable polymers present in the chewing gum base. Such substances may be any enzyme capable of hydrolysing the bonds in the polymers, including as examples hydrolases, esterases, proteases and peptidases.

It is also an aspect of the present invention that the outer coating of the chewing gum element can contain one or more pharmaceutically or cosmetically components including those mentioned hereinbefore.

Accordingly, in further embodiments, the above hard-coated or film-coated chewing gum element of the invention is an element where the outer coating comprises at least one additive component selected from a binding agent, a moisture absorbing component, a film forming agent, a dispersing agent, an antisticking component, a bulking agent, a flavouring agent, a colouring agent, a pharmaceutically or cosmetically active component, a lipid component, a wax component, a sugar, a polyol, a high intensive sweetener, an acid and an agent capable of accelerating the after-chewing degradation of the degradable polymer. If it is desired to defer the effect of any of these additive components in the outer coating until mastication of the chewing gum, such components may, in accordance with the invention be encapsulated using any conventional encapsulation agent such as e.g. a protein including gelatine and soy protein, a cellulose derivative including any of those mentioned above, a starch derivative, edible synthetic polymers and lipid substances, the latter optionally in the form of liposome encapsulation.

In other embodiments, the chewing gum element according to the invention is provided with an outer coating in the form generally described in the art as a soft coating. Such soft coatings are applied using conventional methods and may advantageously consist of a mixture of a sugar or any of the above non-cariogenic, sugar-less or sugarfree sweetening compounds, and a starch hydrolysate and/or hydrogenated starch hydrolysate.

It is another major objective of the present invention to provide a hard coating process for preparing a chewing gum element as defined herein.

In a first aspect of the process a chewing gum mass comprising at least one environmentally degradable elastomeric or resinous polymer is prepared. As used herein, the expression "chewing gum mass" refers to the bulk chewing gum material provided by admixing the chewing gum base components and chewing gum additives as described above using conventional chewing gum mixing equipment. Current conventional processes for providing chewing gum mass comprise at least two separate steps where in a first step, a chewing gum base, typically comprising a variety of elastomeric and resinous compounds, is made, which in a further step is compounded with various chewing gum additives as defined above. Generally, in such conventional processes, the ingredients are mixed by first melting the gum base and adding it to the running mixer. The gum base may alternatively be melted in the mixing apparatus. Although such conventional processes are suitable in the first step of the process of the present invention, it may be advantageous to use a one-step admixing procedure wherein all of the gum base components including one or more degradable polymers as defined herein, and all of the chewing gum additives are charged, in an appropriate order, into a mixing apparatus followed by operating the apparatus at atmospheric pressure or at a pressure above atmospheric pressure until the chewing bulk gum mass is obtained.

In a subsequent step, the thus obtained chewing gum mass is discharged from the mixer and, if required, cooled and shaped or formed such as by extruding into anyone of the above gum centre forms which are subsequently subjected to a hard coating process step comprising at least one coating cycle comprising applying onto the gum centres a solution or suspension of a coating agent, preferably an aqueous solution, and repeating this coating cycle until the coating layer constitutes 0.1 to 75% by weight of the chewing gum element. As the coating agent can be used, separately or in combination, any of the sugars, non-sugar polyols and mono-disaccharides that have been discussed in details above to provide a hard sugar coating or a hard sugarless coating, respectively.

The hard coating of centres typically takes place in tilled, round or horizontally placed cylindrical coating kettles that rotate during the whole process. The coating kettles can be made from copper, stainless steel or fiberglass-reinforced polyester and may be equipped with a piping system that supplies and exhausts air and doses the coating suspension.

A typical coating process according to the invention comprises several coating cycles, each of which is carried out as follows: The chewing gum centres are set in motion in the rotating coating kettle following which the coating solution is introduced at a volume which is selected so as to be permit it to be evenly dispersed over the surfaces of the centres after an appropriate smoothing out time, i.e. the period of time during which the coating solution disperses over the centres, which is typically in the range of about 10 to about 90 seconds such as in the range of about 30 to about 60 seconds. Following this smoothing out step, the centres are dried by means of air. This cycle is repeated 10 to 100 times such as 20 to 80 times until the centres are completely covered and have the preferred measure and the preferred weight. In any event, the present invention contemplates applying an amount of coating agent sufficient to achieve a hard coated chewing element containing 0.1 to 75% by weight coating. The coating suspension can be added to the kettle by being mixed with, sprayed upon, poured over, or added to the gum centres in any manner known to those skilled in the art.

The coating suspension is typically in the form of a syrup of a sugar or any other of the above coating agents including a polyol, at a concentration which is in the range of about 30 to about 75% by weight, such as in the range of about 40 to 60% by weight in an appropriate solvent such as water. When applied onto the gum centres, the coating solution is typically at a temperature in the range of about 20° C. to about 100° C. such as in the range of about 30° C. to about 80° C., e.g. in the range of about 40° C. to about 70° C. such as about 55° C.

In addition, it is contemplated by the present invention that one or more functional or active compounds including fillers, colours, flavour compounds, pharmaceutically active compounds and/or polymer degrading substances of any of the above types may be incorporated into the hard coating during the coating process. Such active compounds can conveniently be added in one or several increments by incorporating them into the coating solution or suspension or they can, alternatively, be applied to the gum centres being coated either as a separate suspension/solution or in solid, powdery form, e.g. by dusting them onto the gum centres.

When applying such an active substance in solid form, the application is preferably performed prior to drying of the previously applied coating layer in order to allow for adherence of a substantial amount of the active substance in solid form to the still sticky coating. Whereas the actual drying time for the coating solution depends on the specific coating formulation used, it is preferred to apply the active substance to the partially coated chewing gum centre immediately after the application of the previous coating layer. Optionally, the partially coated chewing gum centre is wetted before adding the active substance in solid form so as to provide a sticky surface capable of binding the applied active substance. It will be appreciated that an active substance can be added at any of the coating cycles including the final cycle. Additionally, two or more different active or functional components can be applied during the coating process In one preferred embodiment, the active substance being added during the coating process is in encapsulated form thereby providing a high degree of stability of the substance and reducing the tendency of the substance to migrate to the surface of the coated chewing gum. Additionally, the encapsulated active substance is protected against deterioration, e.g. due to oxidation and exposure to light. This is particularly important in connection with flavours and aromatic compounds, especially in the form of ethereal oils, such as peppermint, lemon, lime, and orange.

Encapsulation of active substances to be incorporated into the outer coating is also used to prevent the active substance from reacting with other components in the coating or in the chewing gum centre. Thus, certain active components, including acidic compounds and enzymes, may be capable of promoting pre-chewing degradation of the degradable polymers in the chewing gum centres according to the invention. It will thus be appreciated that undesired degradation of the gum base polymers can be prevented by incorporating such active compounds in the coating layer and that degradation is further prevented or reduced by applying the active substances in encapsulated form.

In the present context, useful encapsulation agents include, but are not limited to, fatty substances, waxes, gelatin, gum arabic, starch, cellulose, cellulose derivatives, shellac, polyvinyl acetate (PVA), polyethylene (PE), casein, zein, B cyclodextrine, silica, yeast cells, and any combination hereof. Presently preferred encapsulation agents include fatty substances such as hydrogenated soy bean, cottonseed, coconut, sunflower, palm kernel, rapeseed, and ricinus oil, or waxes such as beeswax, candelilla wax, carnauba wax, paraffin wax and polyethylene wax. Especially preferred is a mixture of hydrogenated rape oil and carnauba wax.

The hard coating process of the invention may include as further steps, a smoothing step and/or frosting step. The term "smoothing" refers to a treatment including one or more applications or loads of a crystallisable solution which is not as concentrated as that used in the hard coating. The object of this step is to finish the surface appearance of coated products. As for "frosting", while this is also used to improve the products' appearance, it also aims at isolating them from ambient humidity. This technique resembles hard coating in that a crystallisable solution is used. The essential difference is that only one, two or three cycles are carried out.

After completion of the coating cycles, the coated elements may be subjected to a polishing treatment. The polishing also takes place in rotating coating kettles in which a polishing suspension or a polishing powder is added to the coated centres in one or more portions. The polishing suspension typically comprises a wax, an emulsifier, shellac, gum arabic and a solvent such as water. The polishing powder often consists of wax only, or of wax mixed with emulsifier or gum arabic or talc.

Hard coating may be preceded by other coating techniques including the technique generally referred to as "gumming" (or "glazing") or "sealing". Gumming is a technique in which syrups made from non-crystallisable, generally non-hygroscopic matter such as gum arabic, modified starches and celluloses including cellulose acetate phtalate (CAP), shellac, polyvinyl acetate phtalate (PVAP) and maltodextrins are used. This technique enables a vitreous film, serving as a barrier against the migration of oxygen or moisture, to be generated in one or a few applications of solution to the product to be coated. In this pro??cess, use may also be made of powders of various natures in conjunction with the non-crystallisable solution so as to bind the water contained in the syrup. In yet other cases, sugars or polyols which have been melted or liquefied by solvents may be used. The hard, brittle, vitreous layer is then obtained by cooling or by evaporation of the solvents.

In specific embodiments, the coating cycle may include one or more steps where the same or a different coating agent as that used in the coating solution is applied onto the centres being coated, in powder form. An example of such a process is disclosed in U.S. Pat. No. 5,478,593. In further embodiments, the hard coating process according to the invention is a process wherein during the coating at least one additive component selected from the group consisting of a binding agent, a moisture absorbing component, a film forming agent, a dispersing agent, an antisticking component, a bulking agent, a flavouring agent, a colouring agent, a pharmaceutically or cosmetically active component, a lipid component, a wax component, a sugar, a polyol, a high intensive sweetener, an acid and an agent capable of accelerating the after-chewing degradation of the degradable polymer such as a hydrolytically active enzyme.

In a further aspect, the present invention provides a process for coating a chewing gum element as defined above with an edible film. In this process, the initial steps of preparing a chewing gum mass and forming this mass into a desired chewing gum centre form are as described above for the hard coating process. In a subsequent step, an edible film comprising at least one edible film-forming agent is applied to at least a part of the thus formed chewing gum centres to obtain an at least partially coated chewing gum element comprising 0.1 to 75% by weight (preferably 1 to 10% by weight) of the chewing gum element.

In the present context, a film coating can, as it is mentioned above, be defined as a relatively thin polymer-based coat applied to the chewing gum centres of the invention. The thickness of such a coating is usually between 20 and 100 µm. Film coating formulations usually contain the following components: a polymeric film-forming agent, a plasticizer, a pigment and a vehicle (solvent).

The application of the film coating formulation is carried out by spraying or pouring it onto the gum centres while in motion. In the present process any film coating equipment that are used conventionally in the pharmaceutical and confectionery industry can be applied. Such equipment includes coating kettles or pans as described above, fluidised bed coating columns, tapered cylindrical pans/kettles e.g. equipment referred to as the Pelligrini which is open at the front and rear, and which is provided with spray guns mounted on an arm positioned through the front opening. The drying air and exhaust air are both fed in and extracted from the rear. A further useful film coating equipment is a perforated rotary coating pan, which permits the drying air to be drawn co-current with the spray through the tablet bed and pan wall during film coating.

Generally, the coating process consists in one or more cycles of applying an appropriate amount of the coating formulation onto the gum centres, followed by a drying step.

Polymeric materials, plasticizers, pigments and auxiliary substances which are useful in film coating processes have been described above. Additionally, the film coating may include one or more active or functional compounds including those which are useful in hard coating processes as also described above. Accordingly, the film coating applied may contain at least one additive component selected from the group consisting of a binding agent, a moisture absorbing component, a film forming agent, a dispersing agent, an antisticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer including a hydrolytically active enzyme.

In one specific embodiment, the gum centre being subjected to film coating is in the form of a stick which may be coated on one or both sides by simply applying one or more layers of a coating formulation comprising a film-forming agent and a plasticizer, e.g. a wax, onto the sticks.

In a still further aspect the invention pertain to a soft coating process for obtaining a soft coated chewing gum element prepared as described above. As used herein, the expression "soft coating" refers to a process whereby a chewy, soft layer is built up on the surface of the chewing gum centres. This coating is obtained by repeated applications, first of a non-crystallisable carbohydrate solution e.g. containing a starch hydrolysate, and then of a powder, usually crystallised sucrose. The use of any of the above non-cariogenic sweetening compounds in a soft coating process is also conceivable. The soft coating is generally thick, the swelling typically being around 10 to 80%, sometimes even more. Typically, the matter used for the solution is different form that constituting the powder.

In a soft coating process of the invention, the coating formulations may contain any of the active and auxiliary compounds as mentioned above that are used in the hard coating process according to the invention including at least one additive component selected from a binding agent, a moisture absorbing component, a film forming agent, a dispersing agent, an antisticking component, a bulking agent, a flavouring agent, a colouring agent, a pharmaceutically or cosmetically active component, a lipid component, a wax component, a sugar, a non-cariogenic sweeting agent, an acid and an agent capable of accelerating the after-chewing degradation of the degradable polymer such as a hydrolytically active enzyme.

The invention will now be described in further details in the following, non-limiting examples.

EXAMPLE 1

Preparation of Chewing Gum with Peppermint Taste Containing Degradable Gum Base Polymers Using a Conventional Two-Step Process Wherein the Gum Base is Melted Prior to Mixing In this example, a degradable polymer obtained by polymerisation of cyclic esters having unstable bonds that can be broken hydrolytically or under the influence of light, was used as the gum base part. In the following, the polymer is designated as BDP 1. Prior to mixing with the chewing additives as listed below, the gum base polymer was softened/melted in a 100° C. water bath for 30 minutes.

The pre-melted gum base was charged together with about one third of the amount of sorbitol into a conventional double sigma blade mixer (Krupp, Werner & Pfleiderer GmbH, Germany) provided with two blades inside the kettle bowl, each in the shape of the letter "Z", the velocity of which can be set at a velocity in the range of 1 to 110 rpm. In this experiment, the double blade mixer was set at a rotation of 50 rpm. Subsequently, the remaining chewing gum additives as listed in the below Table 1 was added under mixing conditions at the indicated points in time. The composition of the chewing gum formulation and the mixing conditions are summarised in the below Table 1:

TABLE 1

Composition of chewing gum with pre-melted degradable gum base polymer BDP1, and mixing conditions

| Ingredient | Parts (weight) | Time (min.) | Temp (° C.) |
|---|---|---|---|
| BDP1 | 40.46 | 0 | 60 |
| Sorbitol powder | 13.26 | 0 | 60 |
| Lecithin | 0.20 | 2 | 58 |
| Lycasine | 5.77 | 2 | 58 |
| Sorbitol powder | 13.46 | 2 | 58 |
| Sorbitol powder | 13.46 | 4 | 55 |
| Peppermint | 1.54 | 6 | 56 |
| Menthol (crystal) | 0.31 | 6 | 56 |
| Menthol powder | 0.37 | 7 | 58 |
| Peppermint powder | 0.19 | 7 | 58 |
| Menthol powder | 0.19 | 7 | 58 |
| Aspartame | 0.19 | 8 | 58 |
| Acesulfame | 0.1 | 8 | 58 |
| Xylitol | 10.8 | 10 | 58 |
| Total | 100.0 | 12 | 58 |

EXAMPLE 2

Preparation of Chewing Gum with Peppermint Taste Containing Degradable Gum Base Polymers Using a Conventional Two-Step Process Wherein the Gum Base is Melted Prior to Mixing In this example, a chewing gum was prepared essentially as described in Example 1, however, with the modification that a different pre-melted degradable polymer, designated BDP2, having the basic characteristics of BDPlwas used. The composition and the mixing conditions were as listed in the below Table 2:

TABLE 2

Composition of chewing gum with pre-melted degradable gum base polymer BDP2, and mixing conditions

| Ingredient | Parts (weight) | Time (min.) | Temp (° C.) |
|---|---|---|---|
| BDP2 | 40.46 | 0 | 63 |
| Sorbitol powder | 13.26 | 0 | 63 |
| Lecithin | 0.20 | 2 | 63 |
| Lycasine | 5.77 | 2 | 63 |
| Sorbitol powder | 13.46 | 2 | 63 |
| Sorbitol powder | 13.46 | 4 | 63 |
| Peppermint | 1.54 | 6 | 63 |
| Menthol (crystal) | 0.31 | 6 | 63 |
| Menthol powder | 0.37 | 7 | 61 |
| Peppermint powder | 0.19 | 7 | 61 |
| Menthol powder | 0.19 | 7 | 61 |
| Aspartame | 0.19 | 8 | 59 |
| Acesulfame | 0.1 | 8 | 59 |
| Xylitol | 10.8 | 10 | 61 |
| Total | 100.0 | 12 | 58 |

EXAMPLE 3

Preparation of Chewing Gum with Peppermint Taste Containing as the Gum Base Part Degradable Polymers Using a One-Step Mixing Process The one-step process used in this test was essentially as in Example 4 with the modification, however, that the gum base part was the environmentally degradable polyester polymer designated BDP1 as used in Example 1. The composition and the mixing conditions were as listed in the below Table 3:

TABLE 3

Composition of chewing gum with degradable gum base polymer BDP1, and one-step mixing conditions

| Ingredient | Parts (weight) | Time (min.) | Temp (° C.) |
|---|---|---|---|
| Gum base polymer BDP1 | 40.46 | 0 | 25 |
| Sorbitol powder | 13.26 | 0 | 25 |
| Lecithin | 0.20 | 2 | 43 |
| Lycasine | 5.77 | 2 | 43 |
| Sorbitol powder | 13.46 | 2 | 43 |
| Sorbitol powder | 13.46 | 3 | 48 |
| Peppermint | 1.54 | 4 | 51 |
| Menthol (crystal) | 0.31 | 4 | 51 |
| Menthol powder | 0.37 | 5 | 51 |
| Peppermint powder | 0.19 | 5 | 51 |
| Menthol powder | 0.19 | 5 | 51 |
| Aspartame | 0.19 | 6 | 51 |
| Acesulfame | 0.1 | 6 | 51 |
| Xylitol | 10.8 | 8 | 53 |
| Total | 100.0 | 10 | 53 |

As it appears, it was possible to mix all of the chewing gum components in a one-step mixing process within the same time period as as in the corresponding reference two-step process of Example 1 and without reaching a higher temperature in the final chewing gum mass. Indeed, the final temperature in the final chewing gum mass was significantly lower when using a one-step process.

EXAMPLE 4

Preparation of Chewing Gum with Peppermint Taste Containing as the Gum Base Part Degradable Polymers Using a One-Step Mixing Process The one-step process used in this Example was essentially as that of Example 5 with the modification, however, that the gum base part was a different environmentally degradable polyester polymer designated BDP2 and having the same basic characteristics as the polymer used in Example 3. The composition and the mixing conditions were as listed in the below Table 4:

TABLE 4

Composition of chewing gum with degradable gum base polymer BDP2, and one-step mixing conditions

| Ingredient | Parts (weight) | Time (min.) | Temp (° C.) |
|---|---|---|---|
| Gum base polymer BDP2 | 40.46 | 0 | 25 |
| Sorbitol powder | 13.26 | 0 | 25 |
| Lecithin | 0.20 | 2 | 38 |
| Lycasine | 5.77 | 2 | 38 |
| Sorbitol powder | 13.46 | 2 | 43 |
| Sorbitol powder | 13.46 | 3 | 50 |
| Peppermint | 1.54 | 4 | 50 |
| Menthol (crystal) | 0.31 | 4 | 50 |
| Menthol powder | 0.37 | 5 | 50 |
| Peppermint powder | 0.19 | 5 | 50 |
| Menthol powder | 0.19 | 5 | 50 |
| Aspartame | 0.19 | 6 | 50 |
| Acesulfame | 0.1 | 6 | 50 |
| Xylitol | 10.8 | 8 | 54 |
| Total | 100.0 | 10 | 54 |

The mixing time required and the final chewing gum mass temperature were essentially as those obtained for degradable polymer BDP1 when used in a one-step process.

EXAMPLE 5

Preparation of Chewing Gum with Peppermint Taste Containing as the Gum Base Part a Mixture of Degradable Polymers Using a One-Step Mixing Process The chewing gum in this example was prepared essentially as described in Examples 3 or 4, however with the modification that equal amounts of degradable polymer BDP 1 and degradable polymer BDP2, respectively was used as the gum base part instead of either of the individual degradable polymers. The composition and the mixing conditions were as listed in the below Table 5:

TABLE 5

Composition of chewing gum with equal amounts of degradable gum base polymers BDP1 and BDP2, and one-step mixing conditions

| Ingredient | Parts (weight) | Time (min.) | Temp (° C.) |
|---|---|---|---|
| Gum base polymer BDP1 | 20.23 | 0 | 25 |
| Gum base polymer BDP2 | 20.23 | 0 | 25 |
| Sorbitol powder | 13.26 | 0 | 25 |
| Lecithin | 0.20 | 2 | 35 |
| Lycasine | 5.77 | 2 | 35 |
| Sorbitol powder | 13.46 | 2 | 35 |
| Sorbitol powder | 13.46 | 3 | 48 |
| Peppermint | 1.54 | 4 | 50 |
| Menthol (crystal) | 0.31 | 4 | 50 |
| Menthol powder | 0.37 | 5 | 53 |
| Peppermint powder | 0.19 | 5 | 53 |
| Menthol powder | 0.19 | 5 | 53 |
| Aspartame | 0.19 | 6 | 53 |
| Acesulfame | 0.1 | 6 | 53 |
| Xylitol | 10.8 | 8 | 53 |
| Total | 100.0 | 10 | 52 |

The mixing time required and the final chewing gum mass temperature were essentially as those obtained when using either of degradable polymers BDP1 and BDP2 separately.

EXAMPLE 6

Preparation of Chewing Gum with Peppermint Taste Using as the Gum Base a Mixture of Non-Degradable and Degradable Polymers Applying a One-Step Mixing Process Wherein all of the Gum Base Components are Loaded Separately to the Mixing Apparatus In this Example, the gum base part consisted of both a mixture of non-degradable polymers, i.e. polyisobutylene, polyvinyl acetate having low molecular weight and an ester gum, and degradable polymer BDP 1. Each of these chewing gum base components was added separately to the mixing apparatus used in the previous Examples at the points in time indicated in table 6 below:

TABLE 6

Composition of chewing gum with a bum base mixture of non-degradable gum base polymers added separately and the degradable gum base polymer BDP1, and one-step mixing conditions

| Ingredient | Parts (weight) | Time (min.) | Temp (° C.) |
|---|---|---|---|
| Gum base polymer BDP1 | 12.40 | 0 | 35 |
| Polyisobutylene | 4.10 | 0 | 35 |
| Talc | 5.00 | 0 | 35 |
| Polyvinyl acetate, LW | 6.20 | 0 | 35 |
| Ester gum | 4.35 | 1 | 35 |
| Monodiglycerides | 3.75 | 2 | 48 |
| Hydrogenated fat | 5.10 | 2 | 48 |
| Sorbitol powder | 13.26 | 2 | 48 |
| Lecithin | 0.20 | 3 | 52 |
| Lycasine | 5.77 | 3 | 52 |
| Sorbitol powder | 13.42 | 3 | 52 |
| Sorbitol powder | 13.42 | 4 | 53 |
| Peppermint | 1.54 | 5 | 54 |
| Menthol (crystal) | 0.31 | 5 | 54 |
| Menthol powder | 0.37 | 6 | 54 |
| Peppermint powder | 0.19 | 6 | 54 |
| Menthol powder | 0.19 | 6 | 54 |
| Aspartame | 0.19 | 7 | 54 |
| Acesulfame | 0.10 | 7 | 54 |
| Xylitol | 10.78 | 8 | 54 |
| Total | 100.0 | 10 | 54 |

As it appears, it is possible to provide a one-step chewing gum mixing process wherein a range of non-degradable gum base polymers and degradable polymers are added separately in the process and obtain the finished chewing mass within a very short period of time.

EXAMPLE 7

Preparation of Chewing Gum with Peppermint Taste Containing as the Gum Base Part Degradable Polymers Using a One-Step Mixing Process The one-step process used in this test was essentially as in Example 3 with the modification, however, a smaller amount of the degradable gum base polymer was used and the omitted amount replaced by a filler and hydrogenated fat. The composition and the mixing conditions were as listed in the below Table 7 summarising the composition and the mixing conditions:

TABLE 7

Composition of chewing gum with degradable gum base polymer BDP1, and one-step mixing conditions

| Ingredient | Parts (weight) | Time (min.) | Temp (° C.) |
|---|---|---|---|
| BDP 1 | 30.46 | 0 | 28 |
| Sorbitol powder | 13.26 | 0 | 28 |
| Filler | 5.0 | 1 | 38 |
| Hydrogenated fat | 5.0 | 1 | 38 |
| Sorbitol powder | 13.46 | 1 | 38 |
| Lecithin | 0.20 | 3 | 41 |
| Lycasine | 5.77 | 3 | 41 |
| Sorbitol powder | 13.46 | 3 | 41 |
| Peppermint | 1.54 | 5 | 43 |
| Menthol (crystal) | 0.31 | 5 | 43 |
| Menthol powder | 0.37 | 6 | 46 |
| Peppermint powder | 0.19 | 6 | 46 |
| Menthol powder | 0.19 | 6 | 46 |
| Aspartame | 0.19 | 7 | 46 |
| Acesulfame | 0.1 | 7 | 46 |
| Xylitol | 10.8 | 8 | 46 |
| Total | 100.0 | 10 | 46 |

EXAMPLE 8

Hard Coating Processes for the Chewing Gum Obtained in Examples 1-7

Any of the chewing gum mass batches obtained in Examples 1-7 are formed into chewing gum centres by initially rolling them to obtain sheets of chewing gum followed by separating the coherent sheets into tablet form chewing gum centres each having a weight of about 0.9 g.

The thus obtained chewing gum centres are transferred to a DRIA 1200 coating kettle supplied by Driam Metallprodukt GmbH, Germany. The DRIA 1200 equipment is a horizontally placed, cylindrical kettle having a capacity for coating batches of 50 kg of chewing gum centres. The equipment is provided with a computer controlling the amount of dosages of liquid and solid coating substances as well as the smoothing time, the drying time, drying air supply, the temperature of the drying air, and the air flow direction. The equipment is also provided with a pneumatic conveyor having a dispersing arm to supply solid powdery solid substances onto the gum centres, The coating kettle can be set at various velocities from 1 to 15 rpm.

The coating process is carried out as follows: To centres of chewing gum set in motion in the rotating coating kettle, e.g. at a velocity of 7-11 rpm, the coating suspension is added in small portions that disperse evenly over the surfaces of the centers after an appropriate smoothing time. Typically, the smoothing time is in the range of 10-300 seconds. Following the smoothing, the centres are dried by means of air at a temperature in the range of 30-40° C. that is introduced into the kettle for 200 to 500 seconds. The operation is repeated up to 90 times until the centers are completely covered and have reached the desired swelling. In the following, examples are given of coating suspensions that are suitable for coating the chewing gum centres of the present invention:

| 1. Sucrose syrup | |
|---|---|
| Sucrose solution, 70% | 94.45% |
| Gelatine, Bloom value 120-160 | 0.87% |
| Water | 4.68% |

| 2. Sorbitol suspension | |
|---|---|
| Sorbitol liquid/neosorb 70/02 | 97.86% |
| Titanium dioxide | 0.55% |
| Water | 1.59% |

When using the sorbitol suspension as the coating syrup, a typical amount of syrup is 400 g of suspension per 1 kg of gum centres.

| 3. Maltitol coating suspension: | |
|---|---|
| Maltitol powder | 64.0% |
| Gelatine, Bloom value 120-160 | 1.5% |
| Titanium oxide | 0.8% |
| Water | 33.7% |

For 1 kg of chewing gum centers, approximately 850 g maltitol suspension and 15 g maltitol powder are used, dependent on the desired thickness of the coating layer.

During the coating process, one or more active or functional components can be applied to the surface of the gum centres being coated. Such components can be added via the coating syrup or they can be applied in solid form.

When the desired swelling has been achieved, the coating process is typically completed by a polishing step such as it is described hereinbefore. The polishing takes place in the rotating coating kettle into which a polishing suspension or a polishing powder is introduced in one or more portions. A polishing suspension consists typically of wax, emulsifier, shellac, gum arabic and water. A polishing powder consists typically of wax only or of wax mixed with emulsifier, gum arabic or talc.

EXAMPLE 9

Hard Sugar Coating in DRIA 1200 Equipment of 50 kg of Chewing Gum Centres with Peppermint Taste Using a Sucrose Coating Syrup In this example 50 kg of chewing gum centres were coated using a sucrose coating syrup as described in Example 8. In the below table the steps of the process is described:

| Sucrose suspension Dosage No. | Amount of dosage g | Smoothing time sec. | Drying time sec. | Velocity rpm |
|---|---|---|---|---|
| 1-2 | 500 | 45 | 300 | 11 |
| 3-12 | 900 | 45 | 400 | 11 |
| 13 | 600 + 222* | 60 | 400 | 11 |
| 14-15 | 700 | 0 | 380 | 11 |
| 16-21 | 1000 | 0 | 380 | 11 |
| 22-34 | 1000 | 30 | 410 | 11 |
| 35-38 | 600 | 260 | 280 | 11 |
| 39 | 500 | 1500 | 290 | 11 |
| 40 | wax powder 50 g | 300 | 300 | 8 |

*600 g sucrose suspension + 222 g peppermint oil.

The swelling of the chewing gum was 12.1%, i.e. the resulting chewing gum elements had an outer coating layer constituting about 10.8% by weight of the gum elements.

EXAMPLE 10

Hard Sugarless Coating in DRIA 1200 Equipment of 50 kg of Chewing Gum Centres with Peppermint Taste Using a Sorbitol Coating Syrup In this example 50 kg of chewing gum centres were coated using a sorbitol coating syrup as described in Example 8. In the below table the steps of the process is described:

| Sorbitol suspension Dosage No. | Amount of dosage g | Smoothing time sec. | Drying time sec. | Velocity rpm |
|---|---|---|---|---|
| 1-2 | 400 | 0 | 250 | 11 |
| 3-5 | 700 | 15 | 300 | 11 |
| 6 | 700 + 200* | 60 | 300 | 11 |
| 7-16 | 700 | 45 | 300 | 11 |
| 17-24 | 1000 | 45 | 350 | 11 |
| 25-26 | 700 | 240 | 240 | 11 |
| 27 | wax powder 50 g | 360 | 360 | 8 |

*700 g sorbitol suspension + 200 g peppermint oil.

EXAMPLE 11

Effect of Acid and Water on the Degradation of Chewing Gum Centres Consisting of Degradable Gum Base Polymers Chewing gum centres consisting respectively of the degradable polymers BDP 1 and BDP2 as described in Examples 1 and 2, respectively was stored in tap water and a 40% (w/vol) solution of citric acid. The degradation of the polymers was monitored at half weekly intervals by determining the GPC average $M_w$.

The results are summarised in the following tables:

TABLE 11.1

GPC average $M_w$ in chewing gum centres consisting of degradable polymer BDP1

| Week | $M_w$, samples stored in water | $M_w$, samples stored in citric acid |
|---|---|---|
| 0 | 35,529 | 35,529 |
| 0.5 | 30,010 | 28,841 |
| 1 | 27,828 | 28,122 |
| 1.5 | 24,390 | 23,362 |
| 2 | 21,020 | 23,465 |

TABLE 11.1-continued

GPC average $M_w$ in chewing gum centres consisting of degradable polymer BDP1

| Week | $M_w$, samples stored in water | $M_w$, samples stored in citric acid |
|---|---|---|
| 2.5 | 16,696 | 18,648 |
| 3 | 16,179 | 18,202 |
| 3.5 | 15,259 | 17,940 |

TABLE 11.2

GPC average $M_w$ in chewing gum centres consisting of degradable polymer BDP2

| Week | $M_w$, samples stored in water | $M_w$, samples stored in citric acid |
|---|---|---|
| 0 | 24,553 | 24,533 |
| 0.5 | 19,877 | 18,029 |
| 1 | 15,275 | 15,999 |
| 1.5 | 11,161 | 15,465 |
| 2 | 10,274 | 12,920 |
| 2.5 | 13,304 | 9,673 |
| 3 | 8,182 | 9,662 |
| 3.5 | 12,101 | 7,426 |

These experiments demonstrate that the degradable polymers as used herein are highly susceptible to moisture and acidic conditions. Thus, after 3.5 weeks of storage under these conditions, the average $M_w$ was reduced to less than 50% of the initial values.

EXAMPLE 12

Storage Stability Under Extreme Conditions of Coated Chewing Gum Elements Comprising Degradable Polymers A batch of chewing gum centres were prepared that, as the only gum base polymers, contained degradable polymers as defined herein. Part of the batch was hard coated using the process described in Example 8 with sorbitol and maltitol coating suspensions, respectively. The remaining part of the batch was used as non-coated chewing gum centre controls.

The coated centres and the non-coated control centres were stored at 30° C. at RH of 70%, i.e. relatively extreme storage conditions. The degradation of the gum base polymers was monitored by determining at weekly intervals the GPC average $M_w$. The results of this test are summarised in the below Table:

| Week | $M_w$ control | $M_w$, sorbitol coated chewing gum | $M_w$, maltitol coated chewing gum | % $M_w$ control gum centres | % $M_w$, sorbitol coated chewing gum | % $M_w$, maltitol coated chewing gum |
|---|---|---|---|---|---|---|
| 0 | 30,000 | 30,000 | 28,210 | 100 | 100 | 100 |
| 1 | 22,730 | 22,667 | 23,739 | 75.8 | 75.6 | 84.2 |
| 2 | 20,374 | 20,365 | 20,226 | 67.9 | 67.9 | 71.8 |

As it appears, under the high temperature/humidity conditions, there was a relatively rapid degradation of the polymers irrespective of the coating. The sorbitol coating did not improve stability of the polymers, whereas a protective effect of the malitotol coating could be observed. It should be noted, however, that the storage conditions were extreme and would only rarely be encountered in practice. It was therefore decided to repeat the stability test under conditions similar to general ambient conditions

EXAMPLE 13

Storage Stability Under Ambient Environmental Conditions of Coated Chewing Gum Elements Comprising Degradable Polymers A stability test was carried out in the same manner as described in Example 12 with the exception that sorbitol coated and non-coated chewing gum centres were kept at 21° C. at a RH of 55%. The tested chewing gum centres, however, had been stored for about 1 year at ambient conditions prior to being coated. Accordingly, the initial $M_w$ in this experiment was substantially lower than in Example 12, where freshly prepared gum centres were used. This lower initial $M_w$ is an indication of the degradabily of the polymers.

The results of this test are summarised in the below Table:

| Week | $M_w$, control | $M_w$, sorbitol coated chewing gum | % $M_w$, control gum centres | % $M_w$, sorbitol coated chewing gum |
|---|---|---|---|---|
| 0 | 9,800 | 7,000 | 100 | 100 |
| 1 | 10,200 | 7,223 | 100.4 | 103.2 |
| 2 | 9,268 | 6,167 | 94.6 | 88.1 |
| 3 | 6,329 | 6,094 | 62.0 | 84.4 |

As it appears, the initial $M_w$ of the one year old gum centres was substantially reduced as compared to that of the fresh gum centres tested in Example 12. Again this demonstrates that degradable polymers contain unstable bonds that are broken down under environmental conditions. The results of this experiment also demonstrates that the application of a coating layer can reduce the rate of degradation substantially, as after 3 weeks of storage the average $M_w$ of the coated centres was about 85% of the initial value whereas in the non-coated centres it had decreased to about 62%.

The invention claimed is:

1. A coated chewing gum element including about 25 to 99.9% by weight of a chewing gum centre, comprising at least one environmentally degradable elastomeric or resinous polymer, and about 0.1 to 75% by weight of an outer coating.

2. A coated chewing gum element of claim 1 wherein the outer coating, prior to chewing of the chewing gum, causes a reduction of a rate of degradation of the at least one environmentally degradable elastomeric or resinous polymer as compared to the chewing gum of the same composition that is not coated.

3. A coated chewing gum element according to claim 1, wherein the outer coating is a hard coating.

4. A coated chewing gum element according to claim 1, wherein the at least one degradable polymer contains bonds that are chemically unstable.

5. A coated chewing gum element according to claim 4, wherein the chemically unstable bonds can be broken hydrolytically or by exposure to light.

6. A coated chewing gum element according to claim 4, wherein the chemically unstable bonds can be broken under environmental conditions.

7. A coated chewing gum element according to claim 6, wherein at least 10% of the chemically unstable bonds are broken after one month under environmental conditions.

8. A coated chewing gum element according to claim 1, wherein the at least one degradable polymer is selected from the group consisting of an ester, a carbonate, an ether, an amide, a urethane, a peptide, a homopolymer of amino acids and a saccharide.

9. A coated chewing gum element according to claim 8, wherein the polymer is selected from the group consisting of a homopolymer, copolymer, terpolymer and a graft polymer.

10. A coated chewing gum element according to claim 9, wherein the polymer is a polyester polymer obtained by the polymerization of one or more cyclic esters selected from the group consisting of a lactide, a glycolide, a trimethylene carbonate, a δ-valerolactone, a β-propiolactone and a ε-caprolactone.

11. A coated chewing gum element according to claim 10, wherein the polyester polymer is a homopolymer.

12. A coated chewing gum element according to claim 10, wherein the polyester polymer is a copolymer.

13. A coated chewing gum element according to claim 12, wherein the copolymer comprises a copolymer of lactide and ε-caprolactone or a copolymer of ε-caprolactone and δ-valerolactone.

14. A coated chewing gum element according to claim 13, wherein the molecular weight ratio between the lactide and ε-caprolactone is in the range of 99:1 to 80:20.

15. A coated chewing gum element according to claim 10, wherein the average molecular weight of the polyester polymer is in the range of 1,000 to 9,999.

16. A coated chewing gum element according to claim 10, wherein the average molecular weight of the polyester polymer is in the range of 10,000 to 99,999.

17. A coated chewing gum element according to claim 10, wherein the average molecular weight of the polyester polymer is in the range of 100,000 to 1,000,000.

18. A coated chewing gum element according to claim 1, wherein all elastomeric components of the chewing gum centre are environmentally degradable polymers.

19. A coated chewing gum element according to claim 1, wherein the chewing gum centre has a form selected form the group consisting of a pellet, a cushion-shaped pellet, a stick, a tablet, a chunk, a pastille, a pill and a sphere.

20. A coated chewing gum element according to claim 19, wherein the outer coating is a hard coating.

21. A coated chewing gum element according to claim 20, wherein the hard coating comprises a sugar coating or a sugarless coating or a combination thereof.

22. A coated chewing gum element according to claim 21, wherein the hard coating comprises 50 to 100% by weight of a polyol selected from the group consisting of sorbitol, maltitol, xylitol, erythritol, lactitol and isomalt.

23. A coated chewing gum element according to claim 20 wherein the outer coating comprises at least one additive component selected from the group consisting of a binding agent, a moisture absorbing component, a film forming agent, a dispersing agent, an antisticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer.

24. A coated chewing gum element according to claim 23 wherein the agent capable of accelerating the after-chewing degradation of the degradable polymer is a hydrolytically active enzyme.

25. A coated chewing gum element according to claim 23, wherein the at least one additive component is encapsulated.

26. A coated chewing gum element according to claim 1, wherein the outer coating is an edible film comprising at least one of an edible film-forming agent and a wax.

27. A coated chewing gum element according to claim 26, wherein the film-forming agent comprises at least one of a cellulose derivative, a modified starch, a dextrin, gelatine, shellac, gum Arabic, zein, a vegetable gum, and a synthetic polymer.

28. A coated chewing gum element according to claim 26, wherein the element comprises a stick.

29. A coated chewing gum element according to claim 28, wherein one side of the stick is coated.

30. A coated chewing gum element according to claim 28, wherein both sides of the stick are coated.

31. A coated chewing gum element according to claim 1, wherein the outer coating is a soft coating.

32. A coated chewing gum element according to claim 31, wherein the soft coating comprises a sugar or a starch hydrolysate.

33. A coated chewing gum element according to claim 31, wherein the soft coating comprises a sugar free coating agent.

34. A coated chewing gum according to claim 1, wherein the outer coating encapsulates the chewing gum partly.

35. A coated chewing gum according to claim 1, wherein the outer coating encapsulates the chewing gum partly and wherein the outer coating comprises at least one of flavor, acids or active substances.

36. A coated chewing gum according to claim 1, wherein the outer coating encapsulates the chewing gum completely.

37. A coated chewing gum according to claim 1, wherein the outer coating comprises low hydrophilic components.

38. A hard coating process for preparing a chewing gum element, the process comprising:
(i) preparing a chewing gum mass comprising at least one environmentally degradable elastomeric or resinous polymer,
(ii) forming said chewing gum mass into desired chewing gum centres,
(iii) subjecting the thus formed chewing gum centres to at least one coating cycle comprising applying onto the chewing gum centres an aqueous solution of a coating agent, and
(iv) repeating said cycle until a coating layer is formed which constitutes 0.1 to 75% by weight of the chewing gum element.

39. A process according to claim 38, wherein the at least one coating cycle comprises at least one of applying the same coating agent onto the centres in powder form and drying of the partially coated centres.

40. A process according to claim 35, wherein the coating agent comprises at least one of a sugar coating agent and a sugarless coating agent.

41. A process according to claim 40, wherein the coating agent comprises at least one of a polyol and a hydrogentated starch hydrolysate.

42. A process according to claim 41 wherein the polyol is selected from the group consisting of sorbitol, maltitol, mannitol, xylitol, erythritol, lactitol and isomalt.

43. A process according to claim 38, wherein the coating process comprises 10 to 100 coating cycles.

44. A process according to claim 38, wherein, during the coating cycle at least one additive component selected from the group consisting of a binding agent, a moisture absorbing component, a film forming agent, a dispersing agent, an anti-sticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer, is applied.

45. A process according to claim 44 wherein the agent capable of accelerating the after-chewing degradation of the degradable polymer is a hydrolytically active enzyme.

46. A process according to claim 44, wherein the at least one additive component is encapsulated.

47. A process according to claim 38, wherein the chewing gum centres to be coated are subjected to a gumming or glazing treatment.

48. A process according to claim 38, further comprising a smoothing treatment, a frosting treatment or a film coating.

49. A process for coating a chewing gum element-comprising:
(i) preparing a chewing gum mass comprising at least one environmentally degradable elastomeric or resinous polymer,
(ii) forming said chewing gum mass into desired chewing gum centres, and
(iii) applying onto at least a part of the thus formed chewing gum centres an edible film comprising at least one edible film-forming agent
to obtain an at least partially coated chewing gum element comprising 0.1 to 75% by weight of a coating layer.

50. A process according to claim 49 wherein the film-forming agent is selected from the group consisting of a cellulose derivative, a modified starch, a dextrin, gelatine, shellac, gum Arabic, zein, a vegetable gum and a combination thereof.

51. A process according to claim 49, wherein each gum centre is in the form of a stick.

52. A process according to claim 51 wherein both sides of the stick are coated.

53. A process according to claim 51 wherein one side of the slick is coated.

54. A process according to claim 49, wherein the coating comprises at least one additive component selected from the group consisting of a binding agent, a moisture absorbing component, a film forming agent, a dispersing agent, an anti-sticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer.

55. A process according to claim 54 wherein the agent capable of accelerating the after-chewing degradation of the degradable polymer is a hydrolytically active enzyme.

56. A process according to claim 54, wherein the at least one additive component is encapsulated.

57. A soft coating process for obtaining a coated chewing gum element comprising the steps of:
(i) preparing a chewing gum mass comprising at least one environmentally degradable elastomeric or resinous polymer,
(ii) forming said chewing gum mass into desired chewing gum centres,
(iii) subjecting the thus obtained chewing gum centres to a soft coating process comprising alternatively applying to the chewing gum centres a non-crystallisable carbohydrate solution and a sugar powder until a coating layer is formed which constitutes 0.1 to 75% by weight of the chewing gum element.

58. A process according to claim 57 wherein the carbohydrate solution comprises a starch hydrolysate.

59. A process according to claim 57, wherein the coating comprises at least one additive component selected from the group consisting of a binding agent, a moisture absorbing component, a film forming agent, a dispersing agent, an anti-sticking component, a bulking agent, a flavouring agent, a colouring agent, a pharmaceutically or cosmetically active component, a lipid component, a wax component, a sugar, an acid and an agent capable of accelerating the after-chewing degradation of the degradable polymer.

60. A process according to claim 59 wherein the agent capable of accelerating the after-chewing degradation of the degradable polymer is a hydrolytically active enzyme.

61. A process according to claim 59, wherein the at least one additive component is encapsulated.

62. A process according to claim 57, wherein the coating Comprises a sugar-free coating.

* * * * *